United States Patent
Ribarov et al.

(10) Patent No.: US 9,726,029 B2
(45) Date of Patent: Aug. 8, 2017

(54) FLUID COOLING ARRANGEMENT FOR A GAS TURBINE ENGINE AND METHOD

(71) Applicant: Hamilton Sundstrand Corporation, Charlotte, NC (US)

(72) Inventors: Lubomir A. Ribarov, West Hartford, CT (US); James S. Elder, South Windsor, CT (US); Leo J. Veilleux, Jr., Wethersfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 987 days.

(21) Appl. No.: 13/945,070

(22) Filed: Jul. 18, 2013

(65) Prior Publication Data
US 2015/0023776 A1 Jan. 22, 2015

(51) Int. Cl.
*F01D 9/06* (2006.01)
*F01D 25/16* (2006.01)
*F02C 7/14* (2006.01)

(52) U.S. Cl.
CPC ........... *F01D 9/065* (2013.01); *F01D 25/162* (2013.01); *F02C 7/14* (2013.01); *F05D 2250/185* (2013.01); *Y02T 50/672* (2013.01); *Y02T 50/675* (2013.01)

(58) Field of Classification Search
CPC ..... F01D 5/00; F01D 5/08; F01D 5/18; F01D 5/187; F01D 5/188; F01D 5/189; F01D 9/065; F01D 25/08; F01D 25/12; F01D 25/14
USPC ....... 415/115, 116, 177, 178, 180; 60/39.83, 60/226.1, 267; 165/168
See application file for complete search history.

(56) References Cited

U.S. PATENT DOCUMENTS

| 4,574,584 A * | 3/1986 | Hovan | F01D 25/125 184/6.11 |
| 4,830,315 A * | 5/1989 | Presz, Jr. | B64C 21/10 114/102.29 |
| 4,914,904 A * | 4/1990 | Parnes | F01D 9/065 165/168 |
| 7,566,203 B2 * | 7/2009 | Moser | F03D 1/0633 416/235 |

(Continued)

FOREIGN PATENT DOCUMENTS

| EP | 2383437 A | 11/2011 |
| EP | 1630358 | 11/2012 |
| WO | 0238938 A1 | 5/2002 |

OTHER PUBLICATIONS

Combined Search and Examination Report regarding related GB Application No. GB1411679.2; issued Dec. 23, 2014; 2 pgs.

*Primary Examiner* — Dwayne J White
*Assistant Examiner* — Su Htay
(74) *Attorney, Agent, or Firm* — Cantor Colburn LLP

(57) ABSTRACT

A fluid cooling arrangement in a gas turbine engine for aerospace propulsion includes an inner structure. Also included is an outer structure disposed radially outwardly of the inner structure, the outer structure and the inner structure defining a bypass flow path. Further included is at least one strut operatively coupling the inner structure to the outer structure. Yet further included is at least one cooling tube formed within the at least one strut, the at least one cooling tube configured to cool a fluid passing through the at least one cooling tube upon convective cooling of the at least one strut as air passes through the bypass flow path and over the at least one strut.

15 Claims, 3 Drawing Sheets

(56) References Cited

U.S. PATENT DOCUMENTS

| | | | | |
|---|---|---|---|---|
| 8,100,634 B2 * | 1/2012 | Evans | .................. | F01D 5/147 415/115 |
| 2006/0042223 A1 * | 3/2006 | Walker | .................. | F01D 9/065 60/39.08 |
| 2008/0253885 A1 * | 10/2008 | Foose | .................. | F01D 5/147 415/208.2 |
| 2011/0305579 A1 * | 12/2011 | Wood | .................. | F01D 5/141 416/223 R |
| 2012/0027590 A1 * | 2/2012 | Bonnet | ............... | F03D 1/0641 416/1 |
| 2012/0285660 A1 * | 11/2012 | Poltorak | ............... | F28F 21/02 165/104.11 |

* cited by examiner

FLUID COOLING ARRANGEMENT FOR A GAS TURBINE ENGINE AND METHOD

BACKGROUND OF THE INVENTION

The present invention relates to gas turbine engines for aerospace propulsion and more particularly to a fluid cooling arrangement for use with such gas turbine engines, as well as a method of cooling a fluid.

Modern aircraft gas turbine engines operate at ever-increasing turbine temperatures and pressure ratios in order to optimize the open Brayton cycle on which they are based. Advances in materials, turbine cooling techniques and electronic fuel controls, for example, have allowed these efforts to progress substantially through the years.

Typically, each turbine in a multi-spool axial-flow gas turbine engine is mounted within a turbine case. The rotationally mounted rotor blades in each turbine extend radially from its associated spool and rotate due to the expanding hot gases emanating from the upstream combustor. The turbine is rigidly connected to the compressor via a shaft that allows the compressor to rotate and ingest ambient air. Typically, on twin-spool engines, a low pressure turbine (LPT) and low pressure compressor (LPC) are connected by the same shaft. Concentrically surrounding it, and mechanically independent is the shaft which connects the high pressure turbine (HPT) and the high pressure compressor (HPC). A large engine fan is also connected rigidly to the LPC or may be coupled to the LPC via a gear reduction mechanism. The fan is surrounded by a fan case connected to the engine case via support struts. Three-spool engines simply add a third concentric shaft between the low-pressure spool and the high-pressure spool, connecting the intermediate pressure turbine (IPT) to the intermediate pressure compressor (IPC). The various shafts are supported by a series of bearings (ball and/or roller).

During a typical gas turbine engine operating cycle, bearing lubricating oil may reach very high temperatures thus limiting its cooling/lubricating capabilities. In extreme hot conditions (e.g., ground hot day at idle at a high-altitude airport and take-off), oil coking may cause oil cooling passages blockage which in turn may lead to oil starvation resulting in damaged main engine shaft bearings. Therefore, it is important that main engine oil is maintained within its optimal operational temperature range. This ensures that its viscosity, lubricity and pour points remain near their optimal design values. Hence, active cooling of the engine bearing oil is necessary to maintain these operational requirements.

Many attempts have been made to overcome the problem of overheated engine oil by designing various air-to-oil coolers using compressed fan air as the cooling sink. Despite their partial success in mitigating these problems, typical installation of the oil tanks and the related heat exchangers (oil coolers) are located around the engine case and prone to damage during a rotor burst event. In addition to being vulnerable to damage, the associated oil cooling hardware adds weight, complicates maintenance, and operational cost. Hence, there is a need for advanced gas turbine engine oil cooling concepts that address one or more of the above-noted drawbacks.

BRIEF DESCRIPTION OF THE INVENTION

According to one embodiment, a fluid cooling arrangement in a gas turbine engine for aerospace propulsion includes an inner structure. Also included is an outer structure disposed radially outwardly of the inner structure, the outer structure and the inner structure defining a bypass flow path. Further included is at least one strut operatively coupling the inner structure to the outer structure. Yet further included is at least one cooling tube formed within the at least one strut, the at least one cooling tube configured to cool a fluid passing through the at least one cooling tube upon convective cooling of the at least one strut as air passes through the bypass flow path and over the at least one strut.

According to another embodiment, an oil cooling assembly for a turbofan engine includes at least one airfoil operatively coupling an inner structure to a fan case disposed radially outwardly of the inner structure, the fan case and the inner structure defining a bypass flow path. Also included is at least one cooling tube formed within the at least one airfoil, the at least one cooling tube configured to cool an oil passing through the at least one cooling tube upon convective cooling of the at least one airfoil as air passes through the bypass flow path and over the at least one airfoil. Further included is at least one cooling region disposed proximate an outer surface of the airfoil. Yet further included is a trailing edge fin extending from a trailing edge of the at least one airfoil.

According to yet another embodiment, a method of cooling a fluid in a gas turbine engine for aerospace propulsion is provided. The method includes flowing a fluid through at least one fluid cooling tube formed within a strut disposed in a bypass flow path defined by an inner structure and an outer structure. The method also includes cooling the strut via convection with bypass air flowing over the strut in the bypass flow path. The method further includes cooling the fluid via conductive heat transfer of the strut.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
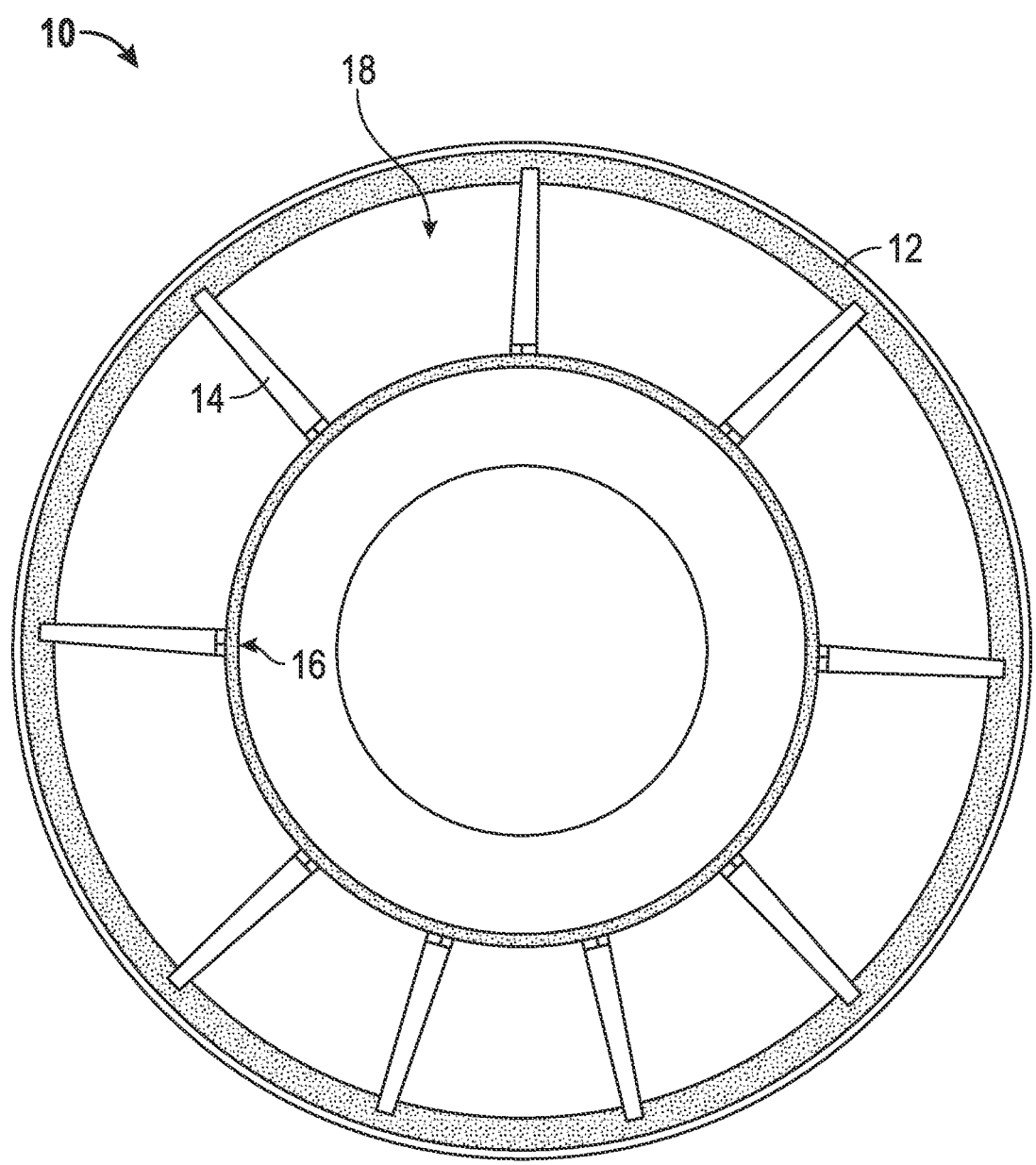
FIG. 1 is a rear elevational view of an outer structure operatively coupled to an inner structure of a gas turbine engine assembly.

Referring to FIG. 1, a portion of a gas turbine engine 10 for aerospace propulsion is illustrated. Various types of gas turbine engines may benefit from the embodiments described herein. In particular, aerospace engines that have internal support struts may benefit. Such engines include low-bypass turbofans, turbojets, etc. Also, some turboprop engines may have small, efficient cores that are basically low-bypass turbofans and/or turbojets. In one embodiment, the gas turbine engine 10 is a turbofan and includes a gas turbine engine core (not illustrated) that is operatively coupled to, and supported relative to, a fan case 12 with at least one, but typically a plurality of struts 14. The gas turbine engine core includes numerous components, such as compressors, combustors and turbine sections, for example, that are housed within an inner structure 16. In one embodiment, the inner structure 16 may be a core nacelle. As noted above, the embodiments described herein may be incorporated with any strut that couples an inner structure to an outer structure.

The particular location of the fan case 12 may vary, relative to the overall structure of the gas turbine engine 10. In one embodiment, the fan case 12 is an intermediate fan case that includes several attachment points for many engine accessories, such as compressor thrust bearings, for example. The plurality of struts 14 are circumferentially spaced from each other and are disposed in a bypass flow path 18 that is defined as a region between the inner structure 16 and the fan case 12. Flowing through the bypass flow path 18 is a high-mass main airflow 20 (FIG. 2) that is compressed by a fan (not illustrated) driven by the gas turbine engine and employed as a propulsive force. The main airflow 20 passes over the plurality of struts 14 and is generally a low-temperature ambient airflow. As the fan bypass ratio (BPR) of the engine is increased, the mass flow of the fan bypass air is increased as well, thereby increasing the available cold ambient air mass flow (at the same low temperature) serving as a heat sink for cooling of the plurality of struts 14.

Figure 2:
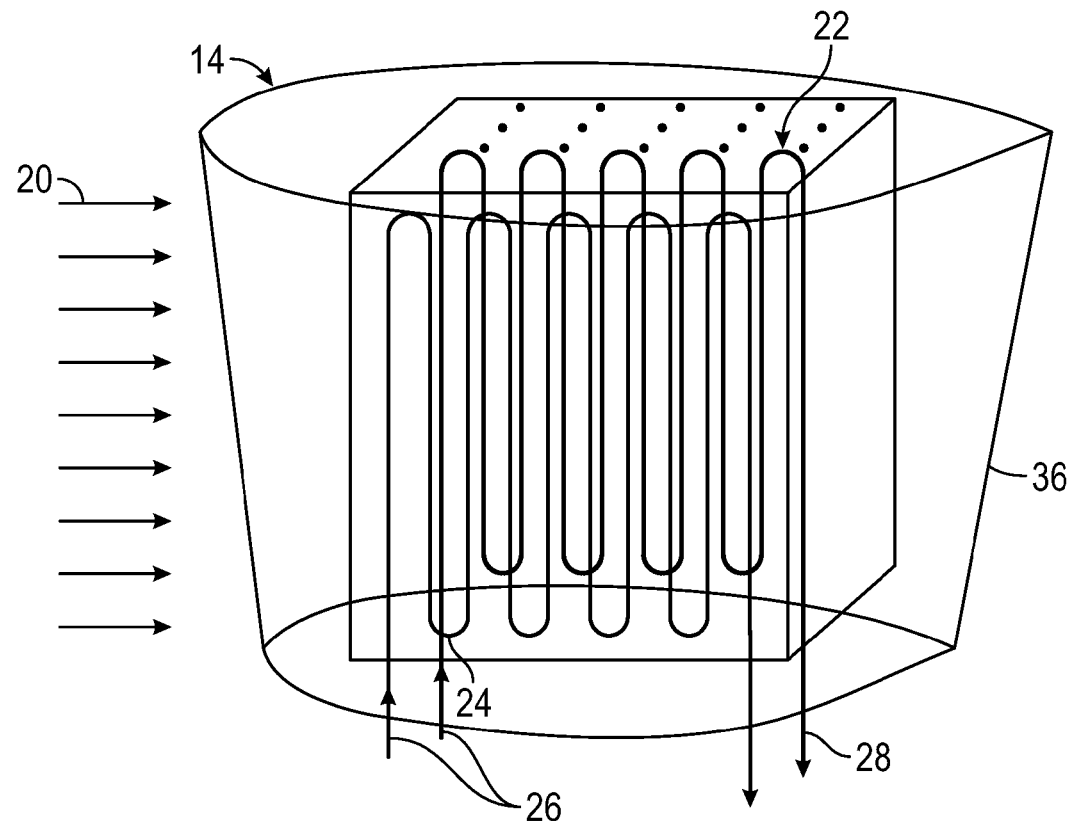
FIG. 2 is a schematic illustration of a fluid cooling arrangement of the gas turbine engine assembly.
Figure 3:
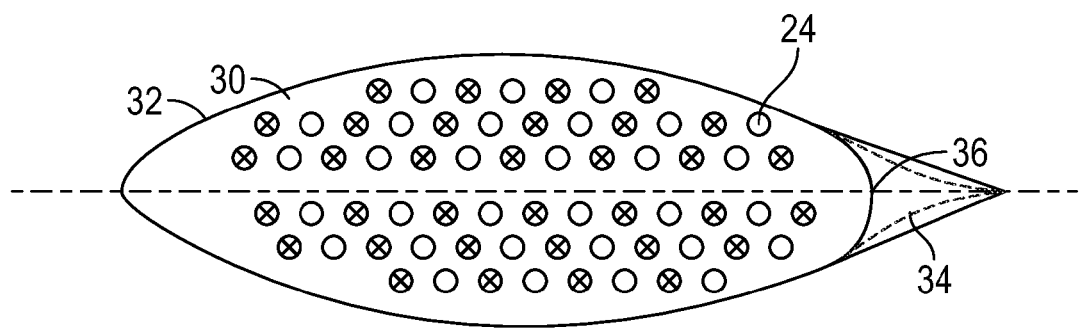
FIG. 3 is a top plan view of the fluid cooling arrangement.

Referring to FIGS. 2 and 3, one of the plurality of struts 14 is illustrated in greater detail. As shown, the strut 14 is generally an airfoil-shaped structure for aerodynamic performance. As described above, the strut 14 is exposed to the main airflow 20 passing through the bypass flow path 18. Based on the generally low temperature of the main ambient airflow 20, a fluid cooling arrangement 22 is included in association with the strut 14. The fluid cooling arrangement 22 includes at least one cooling tube 24 formed within the strut 14. The cooling tube 24 extends from an inlet 26 to an outlet 28 and is configured to provide a path for a fluid to flow. Several fluids may benefit from the fluid cooling arrangement 22. For example, air, fuel, water, refrigerant, engineered cooling fluids, and oil are all contemplated fluids that may pass through the cooling tube 24 for cooling therein. In one embodiment, the fluid is oil to be supplied to bearings that support one or more shafts connecting respective compressors to turbine sections of the gas turbine engine. Irrespective of the particular fluid to be cooled throughout the cooling tube 24, such heat transfer is achieved by passing through the lower temperature environment of the strut 14 via a combination of convective cooling of the strut 14 and conductive cooling of the cooling tube 24.

Although a single cooling tube is described above, it is to be appreciated that a plurality of cooling tubes may be employed, as shown. The cooling tubes 24 may be disposed in numerous contemplated arrangements, including a cross-flow arrangement, a parallel arrangement, and/or a staggered arrangement. The above-described inlet 26 and outlet 28 may be located in various positions. In the illustrated embodiment, both the inlet 26 and the outlet 28 are located at a radially inward location of the strut 14, however, one or both of the inlet 26 and the outlet 28 may be located at a radially outward location of the strut 14.

Convective cooling of the strut 14 is enhanced with the incorporation of at least one cooling region 30 formed within internal regions of the strut 14, including proximate an outer surface 32 of the strut 14. Although the embodiment shown in FIG. 3 and described above relates to the cooling region 30 in specific locations, it is to be appreciated that the cooling region 30 may be included proximate any or all of the outer surface 32 and/or internal regions of the strut, and not merely the regions illustrated. The cooling region 30 includes one or more layers of highly conductive, strong, lightweight materials. Such materials may include metal foams, carbon foams, thermal coatings, aluminum alloys, aluminum matrix composites, beryllium matrix composites, and carbon-carbon (c-c) composites for example. The preceding list is merely exemplary and is not intended to be an exhaustive list of possible materials that may be employed to form the surface cooling space(s) 30. The thermal conductivity of the materials may range from about 200 W/m K (about 115 BTU/hr ft F) to about 2000 W/m K (about 1155 BTU/hr ft F).

Figure 4:
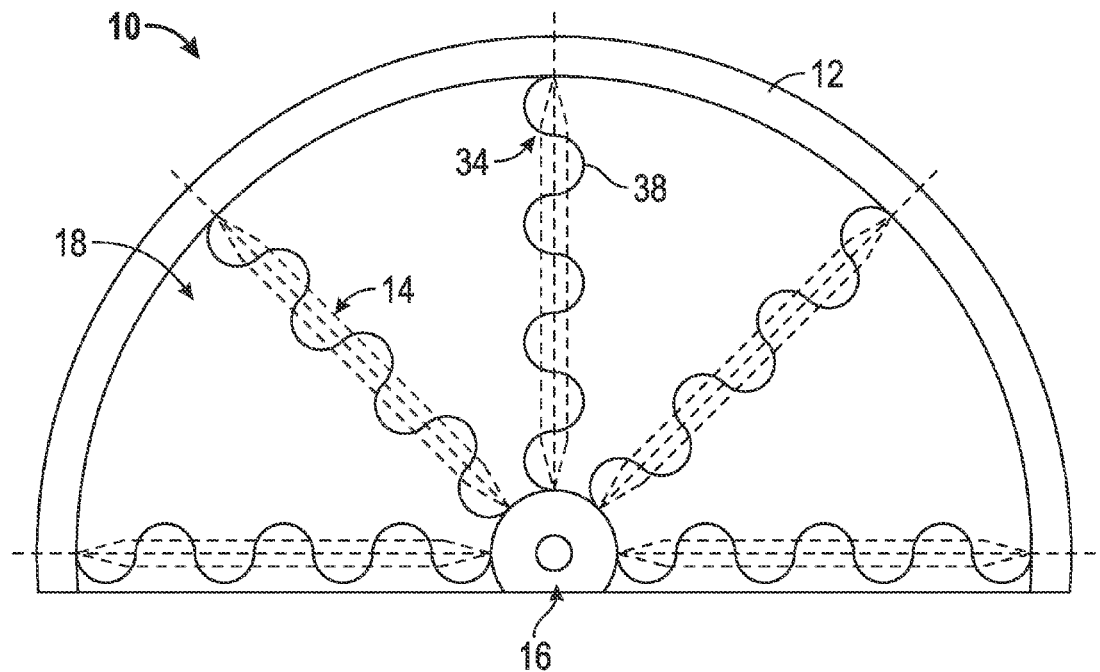
FIG. 4 is a partial rear elevational view of the fluid cooling arrangement.

Referring now to FIG. 4, with continued reference to FIGS. 2 and 3, a trailing edge fin 34 of the fluid cooling arrangement 22 is illustrated. The trailing edge fin 34 is operatively coupled to, or integrally formed with, a trailing edge 36 of the strut 14. The trailing edge fin 34 increases the surface area of the strut 14 to provide enhanced heat transfer for purposes of cooling the strut 14, and the surface cooling space 30, thereby leading to more effective cooling of the fluid passing through the fluid cooling arrangement 22, and more particularly the cooling tube 24. Additionally, various geometric shapes of the trailing edge fin 34 provide additional air mixing throughout the bypass flow path 18 and may improve fan air exit noise abatement capabilities. As noted, the trailing edge fin 34 may be formed of numerous contemplated geometries that increase the surface area of the strut 14 with no adverse aerodynamic effects. Although not illustrated, the strut 14 may also have lateral fins that may further increase its surface area, thus increasing the heat transfer across the strut's surface. Their shape, number and spacing along the strut 14 can be arbitrary as long as they do not create any adverse aerodynamic effects. Practical reasons (accessibility, clogging, braking, weight, etc.) may dictate the judicious inclusion of these additional lateral fins. In one embodiment, a plurality of segments may form the trailing edge fin 34. The illustrated embodiment shows a plurality of half-circles 38 forming a chevron pattern, however, it is to be understood that a continuous structure may be employed and any suitable geometry that does not create additional stress concentration points/surfaces for increasing surface area is envisioned.

The trailing edge fin 34 may be employed as an alternative to the surface cooling space(s) 30 described in detail above, or in combination with the surface cooling space(s) 30. Similar to the surface cooling space 30, the trailing edge fin 34 includes one or more layers of highly conductive, strong, lightweight materials. Such materials may include: metal foams, carbon foams, thermal coatings, aluminum alloys, aluminum matrix composites, and beryllium matrix composites, for example. As noted above, the preceding list is merely exemplary and is not intended to be an exhaustive list of possible materials that may be employed for form the surface cooling space(s) 30.

In certain embodiments, the cooling tube(s) 24 may be formed in the cooling region(s) 30 and/or the trailing edge fin 34 as an alternative to, or in combination with, formation of the cooling tube 24 in a central region of the strut 14, as described above. In such embodiments, the cooling tube 24 is formed proximate the outer surface 32 of the strut 14.

Figure 5:
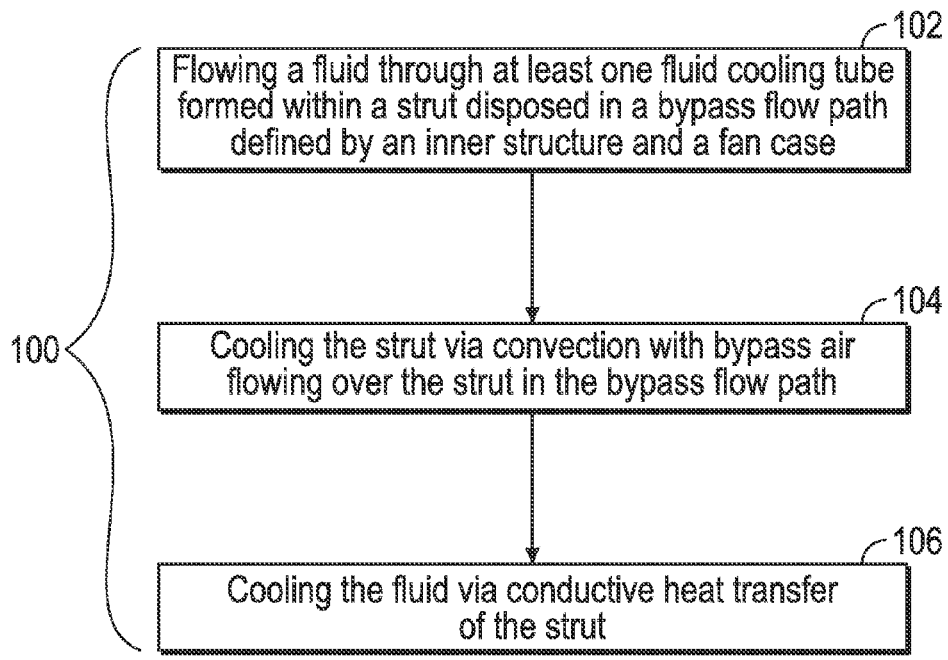
FIG. 5 is a flow diagram illustrating a method of cooling fluid in the gas turbine engine.

A method of cooling a fluid in a gas turbine engine 100 for aerospace propulsion is also provided, as illustrated in FIG. 5 and with reference to FIGS. 1-4. The gas turbine engine 10 and the fluid cooling arrangement 22 have been previously described and specific structural components need not be described in further detail. The method of cooling a fluid in a gas turbine engine 100 includes flowing 102 a fluid through the at least one fluid cooling tube 24 formed within the strut 14 that is disposed in the bypass flow path 18. Also included is cooling 104 the strut 14 via convection with bypass air flowing over the strut 14. The fluid is cooled 106 via conductive heat transfer of the strut 14.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A fluid cooling arrangement of a gas turbine engine for aerospace propulsion, the fluid cooling arrangement comprising:
   an inner structure;
   an outer structure disposed radially outwardly of the inner structure, the outer structure and the inner structure defining a bypass flow path;
   at least one strut operatively coupling the inner structure to the outer structure, the strut comprising an airfoil;
   a single, continuous cooling tube formed within the at least one strut, the cooling tube configured to cool a fluid passing through the cooling tube upon convective cooling of the at least one strut as air passes through the bypass flow path and over the at least one strut, wherein the cooling tube includes an inlet and an outlet, wherein the inlet and the outlet are disposed proximate a radially inward location of the strut; and
   a trailing edge fin extending from a trailing edge of the airfoil.

2. The fluid cooling arrangement of claim 1, further comprising at least one cooling region disposed proximate an outer surface of the at least one strut.

3. The fluid cooling arrangement of claim 2, wherein the cooling region is at least partially formed of at least one conductive material comprising at least one of a metal foam, a thermal coating, an aluminum alloy, an aluminum matrix composite, a beryllium matrix composite.

4. The fluid cooling arrangement of claim 2, wherein the cooling region is at least partially formed of a material having a thermal conductivity of 200 W/m K to 2000 W/m K.

5. The fluid cooling arrangement of claim 1, wherein the trailing edge fin is at least partially formed of at least one conductive material comprising at least one of a metal foam, a thermal coating, an aluminum alloy, an aluminum matrix composite, a beryllium matrix composite, and carbon-carbon composites.

6. The fluid cooling arrangement of claim 1, wherein the trailing edge fin comprises a plurality of segments.

7. The fluid cooling arrangement of claim 6, wherein the plurality of segments comprises a plurality of chevrons.

8. The fluid cooling arrangement of claim 1, wherein the fluid cooling arrangement comprises a plurality of the single, continuous cooling tube, wherein the plurality of cooling tubes is disposed in a cross-flow arrangement.

9. The fluid cooling arrangement of claim 1, wherein the fluid cooling arrangement comprises a plurality of the single, continuous cooling tube, wherein the plurality of cooling tubes is disposed in a parallel arrangement.

10. The fluid cooling arrangement of claim 1, wherein the fluid cooling arrangement comprises a plurality of the single, continuous cooling tube, wherein the plurality of cooling tubes is disposed in a staggered arrangement.

11. The fluid cooling arrangement of claim 1, wherein the fluid passing through the cooling tube comprises oil.

12. The fluid cooling arrangement of claim 1, wherein the gas turbine engine is a turbofan.

13. The fluid cooling arrangement of claim 12, wherein the outer structure comprises a fan case.

14. An oil cooling assembly for a turbofan engine comprising:
    at least one airfoil operatively coupling an inner structure to a fan case disposed radially outwardly of the inner structure, the fan case and the inner structure defining a bypass flow path;
    a single, continuous cooling tube formed within the at least one airfoil, the cooling tube configured to cool an oil passing through the cooling tube upon convective cooling of the at least one airfoil as air passes through the bypass flow path and over the at least one airfoil, wherein the cooling tube includes an inlet and an outlet, wherein the inlet and the outlet are disposed proximate a radially inward location of the strut;
    at least one cooling region disposed proximate an outer surface of the airfoil; and
    a trailing edge fin extending from a trailing edge of the at least one airfoil.

15. A method of cooling a fluid in a gas turbine engine for aerospace propulsion, the method comprising:
    flowing a fluid through a single, continuous fluid cooling tube formed within a strut disposed in a bypass flow path defined by an inner structure and an outer structure, wherein the cooling tube includes an inlet and an outlet, wherein the inlet and the outlet are disposed proximate a radially inward location of the strut;
    cooling the strut via convection with bypass air flowing over the strut in the bypass flow path; and
    cooling the fluid via conductive heat transfer of the strut.

* * * * *